United States Patent
Zeigler (12)

(10) Patent No.: US 10,995,883 B1
(45) Date of Patent: May 4, 2021

(54) PENETRATION SEAL SYSTEM AND METHODS

(71) Applicant: Zepco, LLC, Greer, SC (US)

(72) Inventor: Ronald Zeigler, Greer, SC (US)

(73) Assignee: Zepco, LLC, Greer, SC (US)

( * ) Notice: Subject to any disclaimer, the term of this patent is extended or adjusted under 35 U.S.C. 154(b) by 0 days.

(21) Appl. No.: 16/779,161

(22) Filed: Jan. 31, 2020

(51) Int. Cl.
   *F16L 5/10* (2006.01)
   *F16L 59/12* (2006.01)

(52) U.S. Cl.
   CPC ............. *F16L 5/10* (2013.01); *F16L 59/121* (2013.01)

(58) Field of Classification Search
   CPC ... F16L 5/10; F16L 59/121; F16L 5/02; F16L 41/12
   USPC .......................................... 285/53, 192, 229
   See application file for complete search history.

(56) References Cited

U.S. PATENT DOCUMENTS

| | | | | |
|---|---|---|---|---|
| 4,295,669 A * | 10/1981 | LaPrade | ................ | F16L 59/184 285/419 |
| 7,010,889 B1 * | 3/2006 | Renfro | ................ | F16L 3/1091 138/106 |
| 7,712,791 B1 * | 5/2010 | Whitehead | ................ | F16L 5/02 285/215 |
| 2019/0017701 A1 * | 1/2019 | Aoki | ................ | F23J 13/04 |

OTHER PUBLICATIONS

Combustion Engineering, Inc., Drawing No. E-953-823-1, dated Nov. 12, 1969.

* cited by examiner

*Primary Examiner* — James M Hewitt, II
(74) *Attorney, Agent, or Firm* — Fox Rothschild LLP

(57) ABSTRACT

A penetration seal and its installation method for use with a pipe extending through an opening, or penetration, in a vessel, such as a boiler, containing fluid. A first collar surrounds the pipe adjacent the vessel and is in fluid communication with the opening in the vessel. A second collar has a sleeve portion engaging the exterior of the pipe and is spaced from the first collar. An insulation pillow substantially surrounds the pipe and is connected to the first and second collars. An expansion sleeve substantially surrounds the insulation pillow and is connected to the first and second collars, wherein the sleeve portion of the second collar is configured to compressively engage the exterior surface of the pipe sufficiently to frictionally fix the second sleeve against movement relative to the pipe.

12 Claims, 10 Drawing Sheets

PENETRATION SEAL SYSTEM AND METHODS

BACKGROUND

The disclosure relates generally to a penetration seal and methods for use in connection with an inlet and/or conduit of a heated vessel, and in particular, for use in connection with a pipe outlet from a boiler.

Within the power and pulp industries, expansion joints may be used to relieve stresses in piping and ducting systems caused by thermal expansion and vibration. Expansion joints are used in a variety of industry sectors, including power generating facilities, flue gas cleaning systems, gas turbine systems, petro-chemical plants, chemical plants, pollution control plants and pulp and paper mills. Expansion joints used in these applications generally require considerable resiliency and durability, while at the same time being required to withstand the extraordinary temperatures of gases being conveyed through such piping and ducting systems.

In certain applications, a steam pipe extends through an opening, or "penetration," in an upper wall of a boiler top of the boiler. An annular gap is often provided between the exterior of the steam pipe and the interior diameter of the penetration. This annular region is configured to allow for a certain amount of movement and thermal growth of the steam pipe with respect to the boiler during operation. To accommodate flue gases that may leak through the annular gap, a penetration seal is attached to the flue pipe in a manner that allows for both radial and longitudinal thermal growth and movement of the steam pipe. This attachment often requires portions of the penetration seal to be welded to the steam pipe, which can require time and installation costs and labor. Additionally, after welding, the steam pipe may require heat treatment to maintain its structural heat exposure properties.

Accordingly, providing a penetration seal configured for attachment to a pipe, duct, conduit, etc. without requiring a welding operation may be desirable.

SUMMARY

Generally, an example implementation of the present disclosure may include a penetration seal having a lower collar configured for affixation to a pipe, duct, conduit, etc. (referred to collectively herein as "pipe") proximate an opening, or penetration, of a heated vessel, such as a boiler. The lower collar includes two semicircular halves having a radially outwardly extending flange for engaging a surface of the vessel adjacent the penetration to allow for some margin of error in lining up and/or centering the ring-shaped lower collar with the penetration. The diameter of the lower portion of the collar may be slightly less than the diameter of the penetration.

An upper collar is configured for affixation to the pipe which includes a sleeve portion that somewhat compressively engages the pipe, thereby giving sufficient frictional or interference engagement to secure the upper collar to the pipe to thereby negate the necessity of welding the upper collar to the pipe.

During installation, one or more temporary supports and/or spacer straps are configured for attachment to the upper and lower collars to allow for proper spacing of the upper collar from the lower collar. Once the upper collar is sufficiently lined up and attached to the pipe, such straps are removed.

An insulation pillow is attached to both the upper collar and the lower collar in a circumferentially extending manner. The insulation pillow is configured to surround the pipe to provide thermal insulation. An expansion joint, or sleeve, which can be of composite material, is connected to and spans between the upper and lower collars and is outboard of and surrounds the insulation pillow. One or more circular or semicircular attachment, members, or bars, attach the expansion sleeve to the upper collar and to the lower collar.

The insulation pillow may be made of fiberglass mat insulation or ceramic insulation, as desired and/or depending on the temperature, and the expansion sleeve may be made of composite material with fiberglass and/or ceramic insulation, fiberglass cloth, and a polytetrafluoroethylene (PTFE) material, such as Teflon®, outer cover. The expansion sleeve may be a laminated product of multiple layers, and in certain implementations may include an inward-most layer configured to be in contact with the hot fluids or gases, such as flue gases, of the boiler or vessel and may be comprised of a ceramic fabric and/or a fiberglass fabric, depending on the temperature to be experienced by the expansion sleeve. The layer adjacent the inward-most layer may be thermal fiberglass insulation and/or ceramic insulation.

In certain example implementations of the present disclosure, a penetration seal is disclosed for a pipe extending through an opening in a vessel containing fluid, the penetration seal including a first collar configured for surrounding the pipe adjacent the vessel and for being in fluid communication with the opening in the vessel. A second collar has a sleeve portion configured for engaging the exterior of the pipe and being spaced from the first collar. At least one insulation pillow is configured to substantially surround the pipe and is also configured to be connected to the first collar and to the second collar. At least one expansion sleeve substantially surrounds the insulation pillow and is configured to be connected to the first collar and to the second collar, wherein the sleeve portion of the second collar is configured to compressively engage the exterior surface of the pipe sufficiently to frictionally fix the second sleeve against movement relative to the pipe.

Implementations of the present disclosure may include the first collar being generally ring-shaped and including a plurality of semicircular first collar portions and/or the second collar being generally ring-shaped and including a plurality of semicircular second collar portions.

Also, implementations of the present disclosure may include the first collar including a cylindrical portion having a radially-extending ring-shaped first flange with a circumferentially extending lip portion. The lip portion extends generally perpendicularly with respect to the first flange and is connected to the expansion sleeve. A radially-extending second flange is spaced from the first flange, wherein the second flange is configured for engagement with the vessel and for encircling the opening in the vessel.

Additionally, implementations of the present disclosure may include the sleeve portion being cylindrical, the second collar being generally ring-shaped, and the second collar including a circumferentially extending rim portion spaced from the sleeve portion, with the rim extending generally parallel to the sleeve portion.

Further, implementations of the present disclosure may include the sleeve portion being cylindrical, the second collar being generally ring-shaped, and the second collar including a circumferentially extending rim portion spaced from the sleeve portion, with the rim extending generally parallel to the sleeve portion, and also including a plurality of radially-extending ribs, which in an exemplary implementation could be trapezoidal-shaped, extending between the sleeve portion and the rim.

Still further exemplary implementations of the present disclosure include at least one strap configured to be selectively attached to and removed from the first collar and the second collar, wherein upon the strap being connected to the first collar and the second collar, the strap spaces the second collar from the first collar by a predetermined distance.

Yet further exemplary implementations of the present disclosure include the sleeve portion being cylindrical and the second collar being generally ring-shaped, and further comprising the second collar including a circumferentially extending rim portion spaced from the sleeve, the rim extending generally parallel to the sleeve, and at least one ring member configured for attaching the expansion sleeve to the rim of the second flange.

Also, exemplary implementations of the present disclosure include the sleeve portion being cylindrical and the second collar being generally ring-shaped, and additionally comprising the second collar including a circumferentially extending rim portion spaced from the sleeve, the rim extending generally parallel to the sleeve, and at least one ring member configured for attaching the expansion sleeve to the rim of the second flange.

In further exemplary implementations of the present disclosure, a penetration seal includes a second collar made in the same material as the pipe in order to have approximately the same thermal expansion coefficient as the pipe.

Additionally, exemplary implementations of the present disclosure include the second collar being generally ring-shaped and having two or more semicircular second collar portions and at least one ring member being configured for attaching the expansion sleeve to the plurality of second collar portions.

Exemplary implementations of the present disclosure also include the expansion sleeve comprising laminated material having multiple layers, and includes a ceramic fabric and fiberglass fabric and/or a first layer including fiberglass insulation, ceramic insulation, and/or fiberglass cloth. and a second layer including a polytetrafluoroethylene (PTFE) material.

Exemplary implementations of the present disclosure include the insulation pillow comprising fiberglass mat insulation and/or ceramic insulation as well.

In exemplary implementations of the present disclosure, a gasket, which could include a fiberglass gasket strip or tape, is configured to be interposed between the sleeve portion of the second collar and the exterior surface of the pipe.

In further exemplary implementations of the present disclosure, the second collar includes a plurality of semicircular second collar portions and further comprises a gasket, which could include a fiberglass gasket strip or tape, interposed between each of the plurality of semicircular second collar portions.

Exemplary implementations of the present disclosure include an apparatus, including a vessel configured for containing a heated fluid such as heated gas or gases and/or liquids, the vessel defining an opening in fluid communication with the heated fluid. A pipe extends through the opening, and a penetration seal is configured for attachment to the pipe and to the vessel. The penetration seal includes a first collar configured for surrounding the pipe adjacent the vessel and for being in fluid communication with the opening in the vessel. A second collar has a sleeve portion configured for engaging the exterior of the pipe and is spaced from the first collar. At least one insulation pillow is configured to substantially surround the pipe and to be connected to the first collar and to the second collar. At least one expansion sleeve substantially surrounds the insulation pillow and is configured to be connected to the first collar and to the second collar. At least one circular or semicircular first attachment, backup, or ring, member is configured to attach the expansion sleeve to the first collar. And, at least one circular or semicircular second attachment, backup, or ring, member is configured to attach the expansion sleeve to the second collar, and wherein the sleeve portion of the second collar is configured to compressively engage the exterior surface of the pipe sufficiently to frictionally fix the second sleeve against movement relative to the pipe.

Exemplary implementations of the present disclosure include a method for sealing a penetration of a pipe extending through an opening in a vessel containing fluid that includes the steps of: attaching adjacent the vessel a first collar that surrounds the pipe and is in fluid communication with the opening in the vessel; attaching a second collar to the pipe at a location spaced from the first collar, the second collar having a sleeve portion configured to compressively engage the exterior surface of the pipe sufficiently to frictionally fix the second sleeve against movement relative to the pipe; surrounding the pipe with at least one insulation pillow; attaching the insulation pillow to the first collar and to the second collar; substantially surrounding the insulation pillow with an expansion sleeve; and attaching the expansion sleeve to the first collar and to the second collar using at least one circular or semicircular first attachment, backup, or ring, member configured to attach the expansion sleeve to the first collar. Additional exemplary implementations of the present disclosure include the method comprising the second collar being generally ring-shaped and including a plurality of semicircular second collar portions, and the step of attaching at least one circular or semicircular attachment, backup, or ring, member to the expansion sleeve and to the plurality of second collar portions. Further exemplary implementations of the present disclosure include the steps of spacing the second collar from the first collar by a predetermined distance; and attaching at least one strap to the first collar and to the second collar, wherein the strap selectively releasably fixes the separation of the first collar and the second at the predetermined distance.

Moreover, in implementations of the present disclosure, a penetration seal is provided which prevents escape of fluids, including gases and/or liquids, in a vessel and accommodates thermal growth and contraction of a pipe extending from the vessel and the consequential movement of the upper collar and the lower collar with respect to one another.

DETAILED DESCRIPTION

Figure 1:
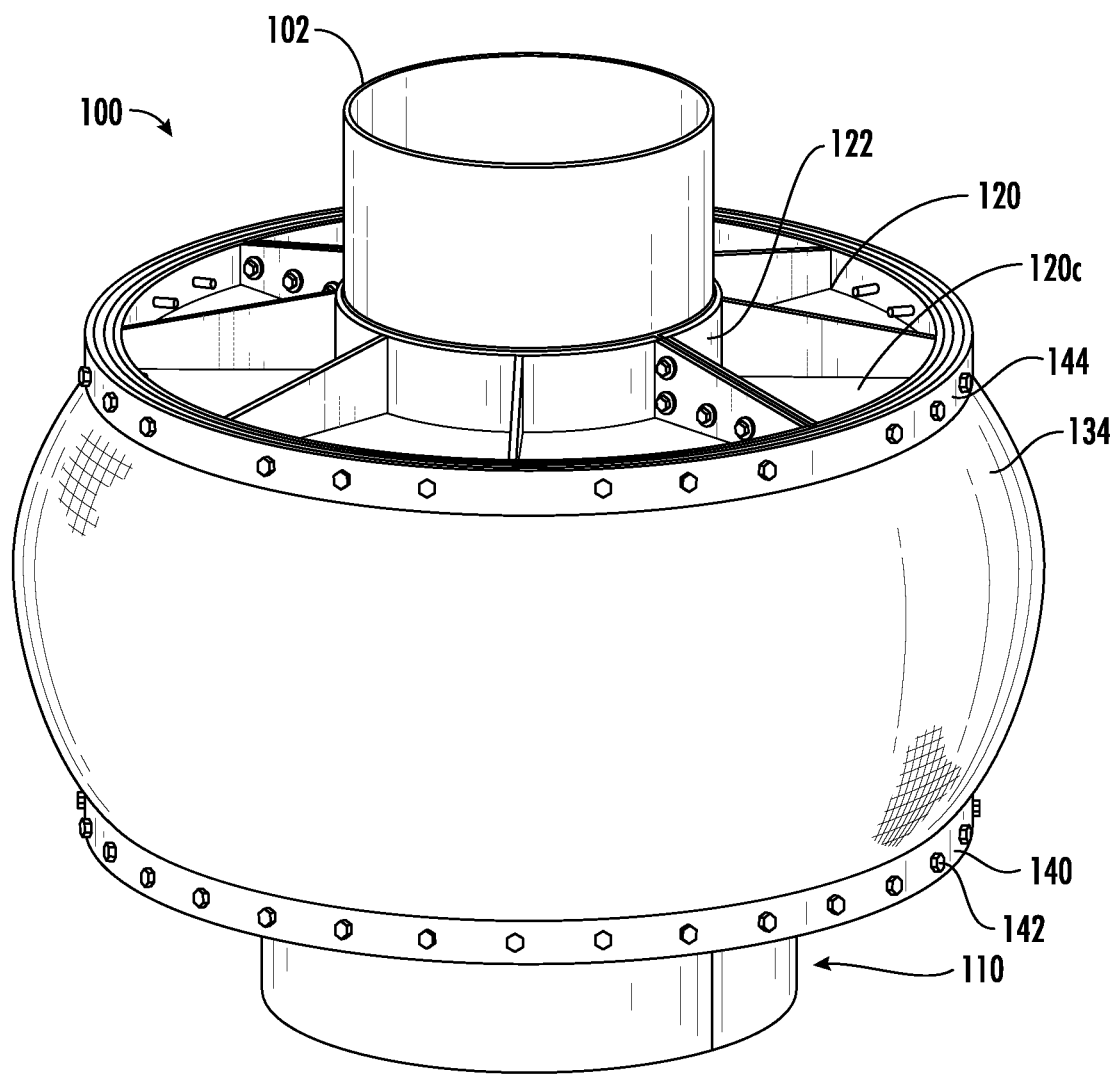
FIG. 1 is a perspective view of an example implementation of a penetration seal of the present disclosure.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." When used in this document, the term "exemplary" is intended to mean "by way of example" and is not intended to indicate that a particular exemplary item is preferred or required.

In this document, when terms such "first" and "second" are used to modify a noun, such use is simply intended to distinguish one item from another, and is not intended to require a sequential order unless specifically stated. The term "approximately," when used in connection with a numeric value, is intended to include values that are close to, but not exactly, the number. For example, in some implementations, the term "approximately" may include values that are within +/−10 percent of the value.

When used in this document, terms such as "top" and "bottom," "above" and "below", "upper" and "lower", or "front" and "rear," are not intended to have absolute orientations but are instead intended to describe relative positions of various components with respect to each other. For example, a first component may be an "upper" component and a second component may be a "lower" component when a device of which the components are a part is oriented in a first direction. The relative orientations of the components may be reversed, or the components may be on the same plane, if the orientation of the structure that contains the components is changed. The claims are intended to include all orientations of a device containing such components.

As show in the figures, exemplary implementations are depicted of a penetration seal, generally 100, and methods for use thereof in connection with an inlet and/or conduit, such as a pipe, duct, conduit, etc. (referred to collectively herein as "pipe"), generally referred to herein as pipe 102, of a heated vessel, generally 104 (FIG. 9), and in particular, for use in connection with a pipe penetration, or opening or outlet, generally 106, in the top wall 108 of vessel 104.

Figure 4:
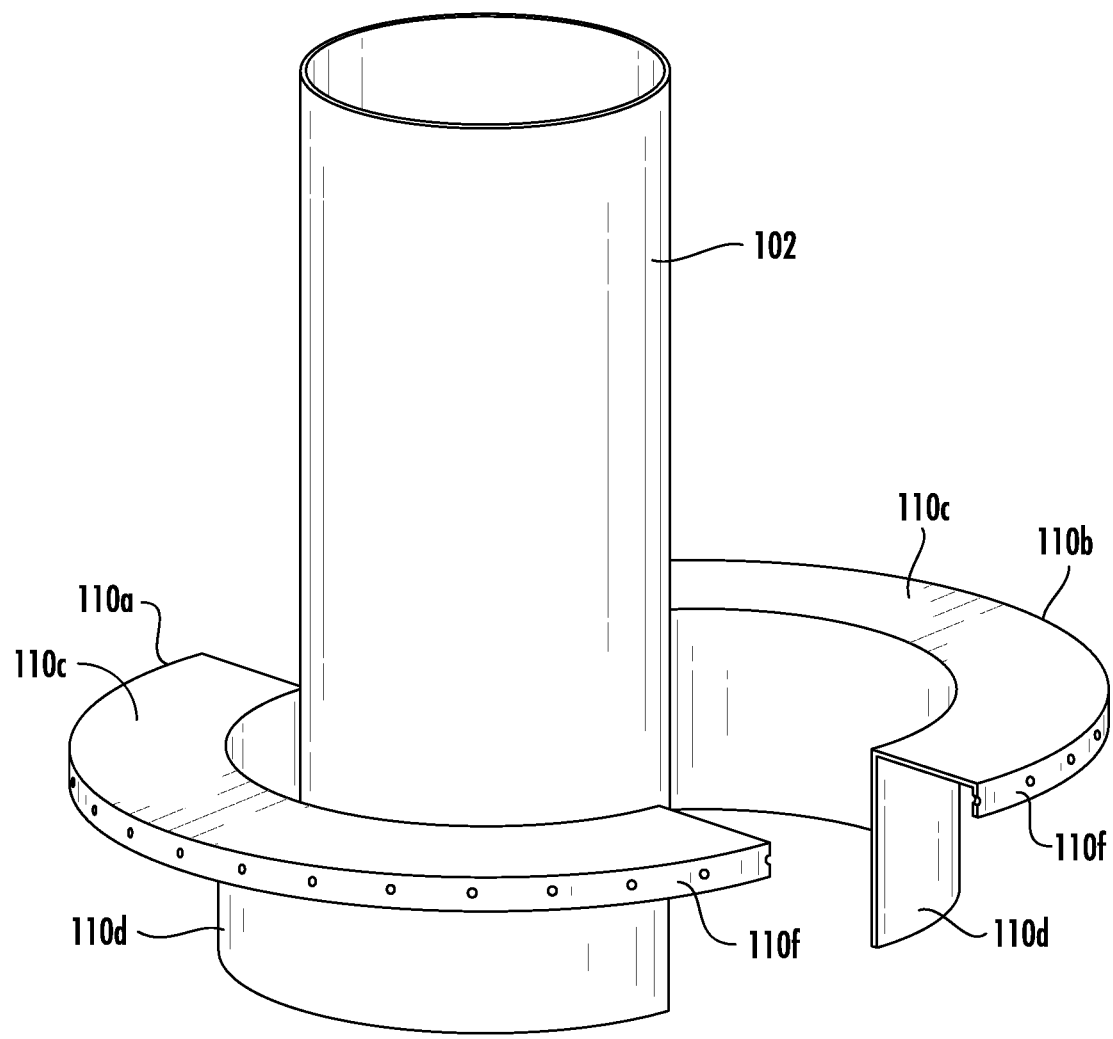
FIG. 4 is a perspective view of an example implementation of the penetration seal of the present disclosure, including lower collar portions for surrounding a pipe.
Figure 5:
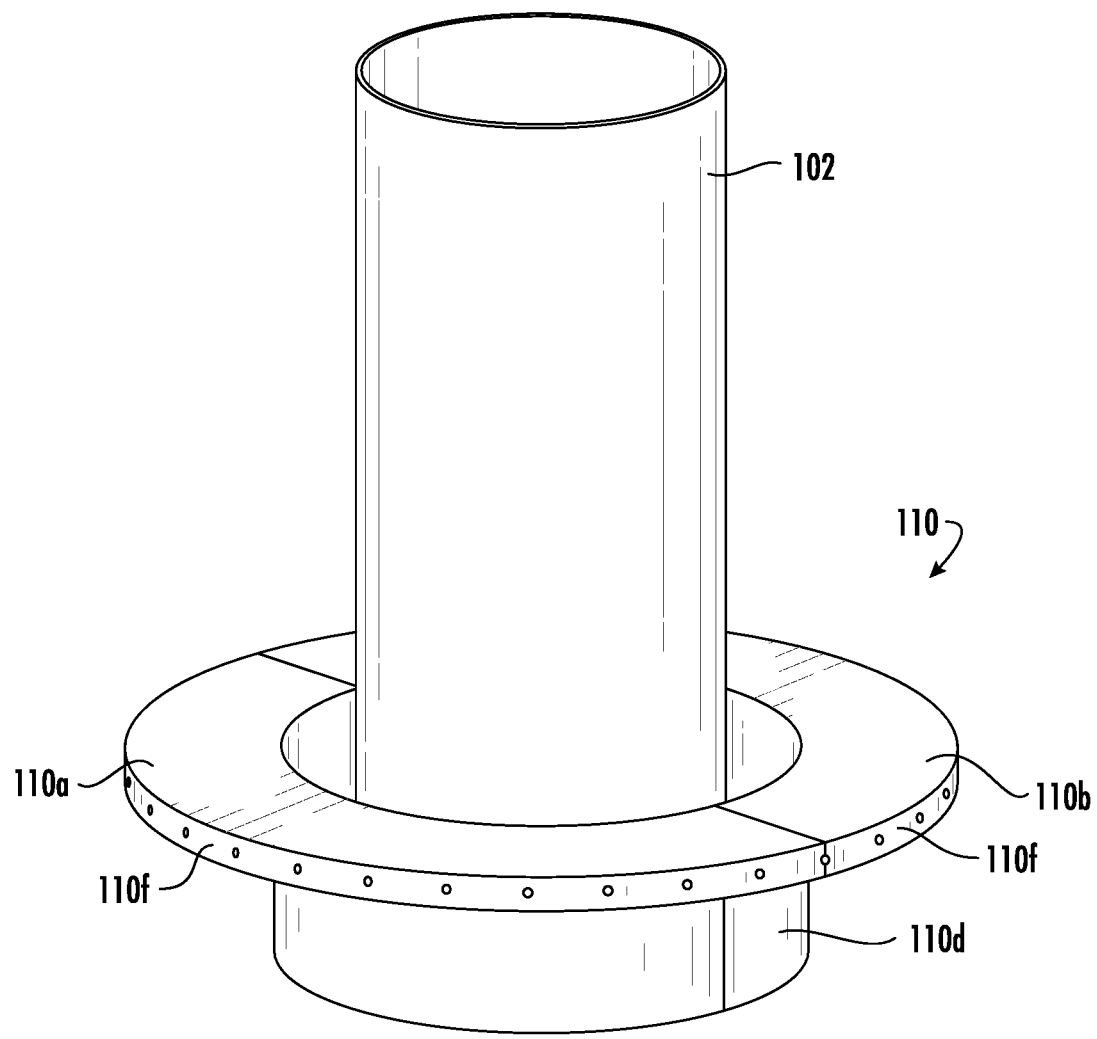
FIG. 5 is a perspective view of an example implementation of the penetration seal of the present disclosure shown in FIG. 4, including an assembled lower collar.

As shown in FIGS. 4 and 5, penetration seal 100 includes a ring-shaped lower collar 110 configured for affixation to wall 108 of vessel 104 proximate opening 106. The lower collar 110 includes two semicircular segments or halves 110a, 110b, each having a radially outwardly extending flange portion 110c. (It is to be noted that while semicircular segments 110a and 110b are halves of collar 110, it is to be understood that such segments could include more than two segments, if desired, and are not limited to being halves of a circle.)

The lower collar includes a sleeve portion 110d, the diameter of which may be slightly less than the diameter of the penetration 106, and also a radially outwardly extending flange portion 110e (FIG. 9) opposite flange portion 110c for engaging surface of the wall 108 the vessel 104 adjacent the penetration 106. Flange portions 110e allow for some margin of error in lining up and/or centering the lower collar 110 with respect to the penetration 106. Upon semicircular halves 110a, 110b being placed together, as shown in FIG. 5, flange portions 110e are attached to wall 108 by welding or other suitable fasteners, such as bolts, screws, rivets, etc.

Figure 10:
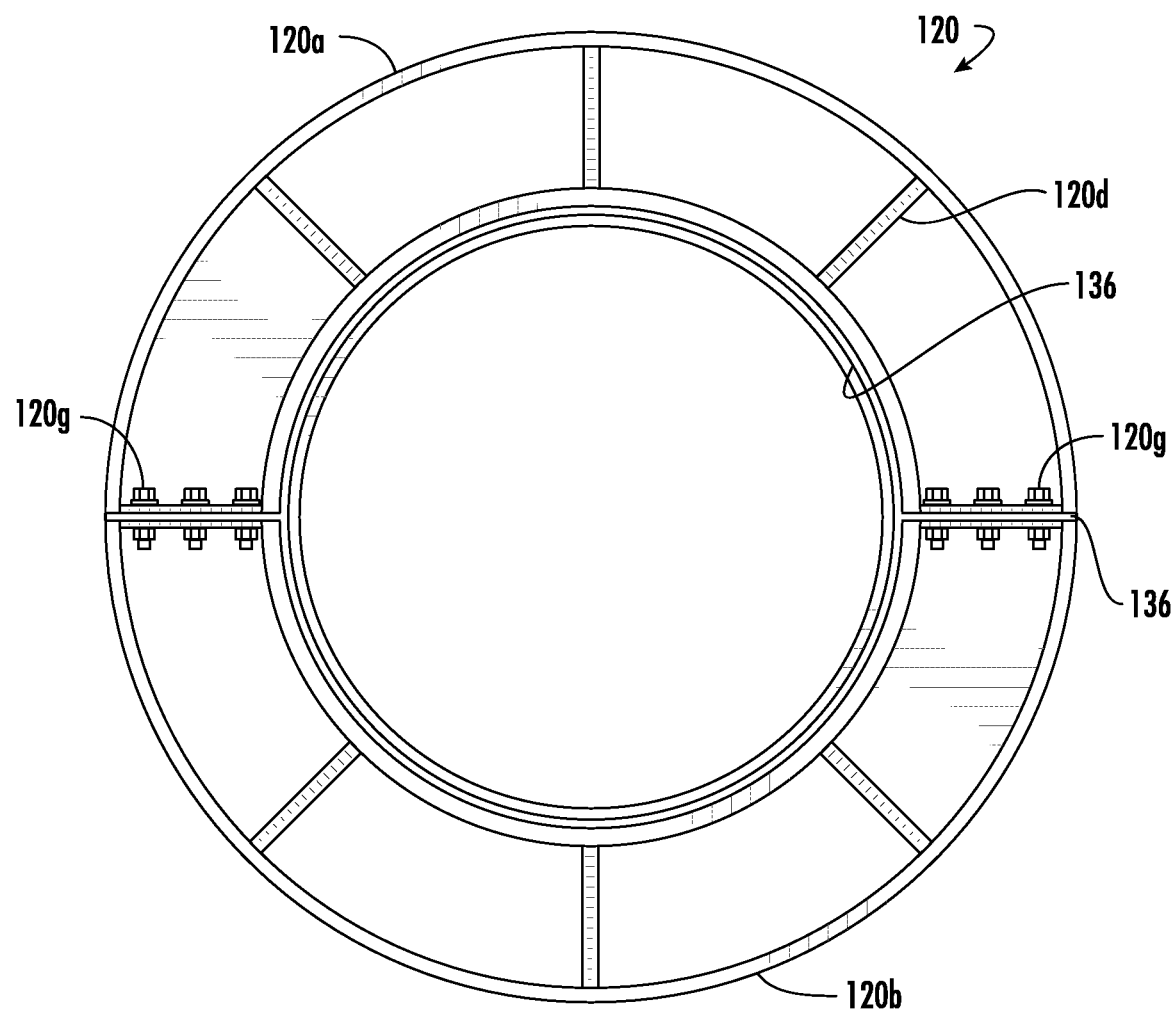
FIG. 10 is a plan view of an example implementation of an upper collar for a penetration seal of the present disclosure.

An upper collar 120 (FIGS. 6, 7, and 10) is configured for affixation to the pipe 102 and includes two semicircular segments or halves 120a, 120b, each having a radially outwardly extending flange portion 120c and trapezoidal-shaped ribs 120d. (It is to be noted that while semicircular segments 120a and 120b are halves of collar 120, it is to be understood that such segments could include more than two segments, if desired, and are not limited to being halves of a circle.)

Each rib 120d has a larger end 120e connected to an elongated sleeve portion 120f that receives pipe 102 and which to some extent compressively engages pipe 102 once collar segments 120a, 120b encircle and are installed around, thereby giving sufficient frictional or interference engagement between the assembled upper collar 120 and pipe 102 to secure the upper collar 120 to pipe 102. This manner of connection of upper collar 120 to pipe negates the necessity of welding the upper collar 120 to pipe 102. As result, the need to heat treat pipe 102 and upper collar 120 after collar 120 is attached to pipe 102 is eliminated, thereby saving time and expense and reducing the complexity of installation of penetration seal 100.

To minimize undue thermal stress on pipe 102, the upper collar 120, in exemplary implementations, is made in the same material as pipe 102 so as to have essentially the same expansion coefficient as pipe 102, thereby expanding and contracting commensurate with the expansion and contraction of pipe 102.

During installation of penetration seal 100 on pipe 102 and vessel 104, one or more temporary support and/or spacer straps 124 are configured for attachment to the lower and upper collars 110, 120 to allow for proper spacing of upper collar 120 from lower collar 110. Once the upper collar 120 is sufficiently lined up and attached to pipe 102, straps 124 are removed.

An insulation pillow 130 is attached to both upper collar 120 and lower collar 110 in a circumferentially extending manner. The insulation pillow 130 is configured to surround pipe 102 to provide thermal insulation, particularly to protect an expansion joint, or sleeve, generally 134, which can be of composite material, which is connected to and spans between the upper and lower collars 120, 110 and is outboard of and surrounds the insulation pillow 130. One or more circular or semicircular attachment, members, or bars, 138 attach the expansion sleeve 134 to the upper collar 120 and to the lower collar 110.

The insulation pillow 130 may be made of fiberglass mat insulation or ceramic insulation, as desired and/or depending on the temperature, and the expansion sleeve 134 may be made of composite material with layer 134a of fiberglass and/or ceramic insulation, fiberglass cloth, and a polytetrafluoroethylene (PTFE) material, such as Teflon®, outer cover 134b. The expansion sleeve 134 may be a laminated product of multiple layers, and in certain implementations, may include an inward-most layer configured to be in contact with the hot fluids or gases, such as flue gases, of the boiler or vessel 104 and may be comprised of a ceramic fabric and/or a fiberglass fabric, depending on the temperature to be experienced by the expansion sleeve 134. The layer adjacent the inward-most layer may be thermal fiberglass insulation and/or ceramic insulation.

In exemplary implementations, a gasket 136, which could include fiberglass gasket, strip or tape, is configured to be interposed between the sleeve portion 120f of the second collar 120 and the exterior surface of pipe 102. Gasket 136 could be, in an example implementation, approximately ⅜ inches thick. Also, gasket 136 may be interposed between each face 120j (FIG. 6) of each of the second collar portions 120.

Figure 6:
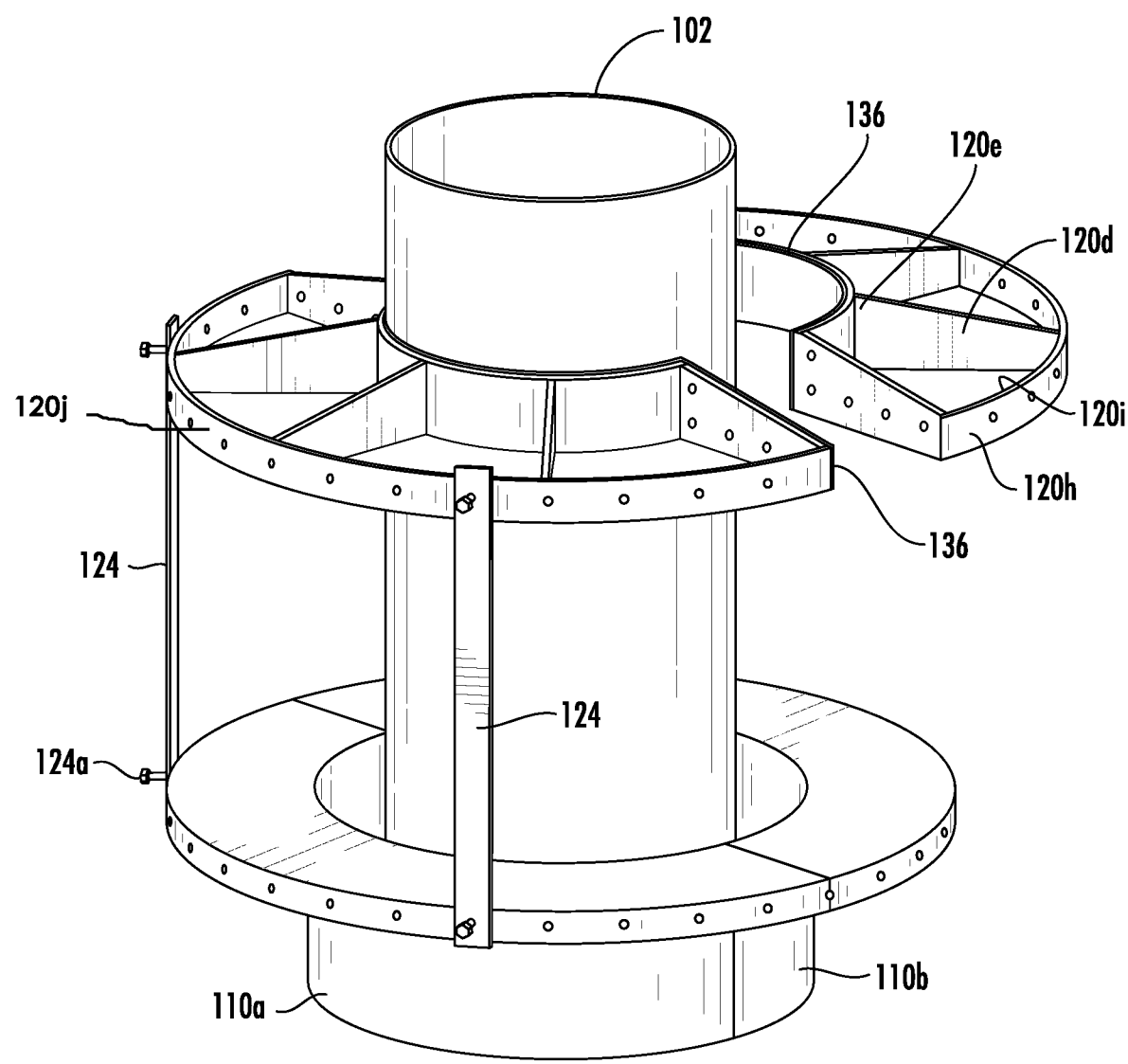
FIG. 6 is a perspective view of an example implementation of the penetration seal of the present disclosure shown in FIG. 5, including straps and upper collar portions.
Figure 7:
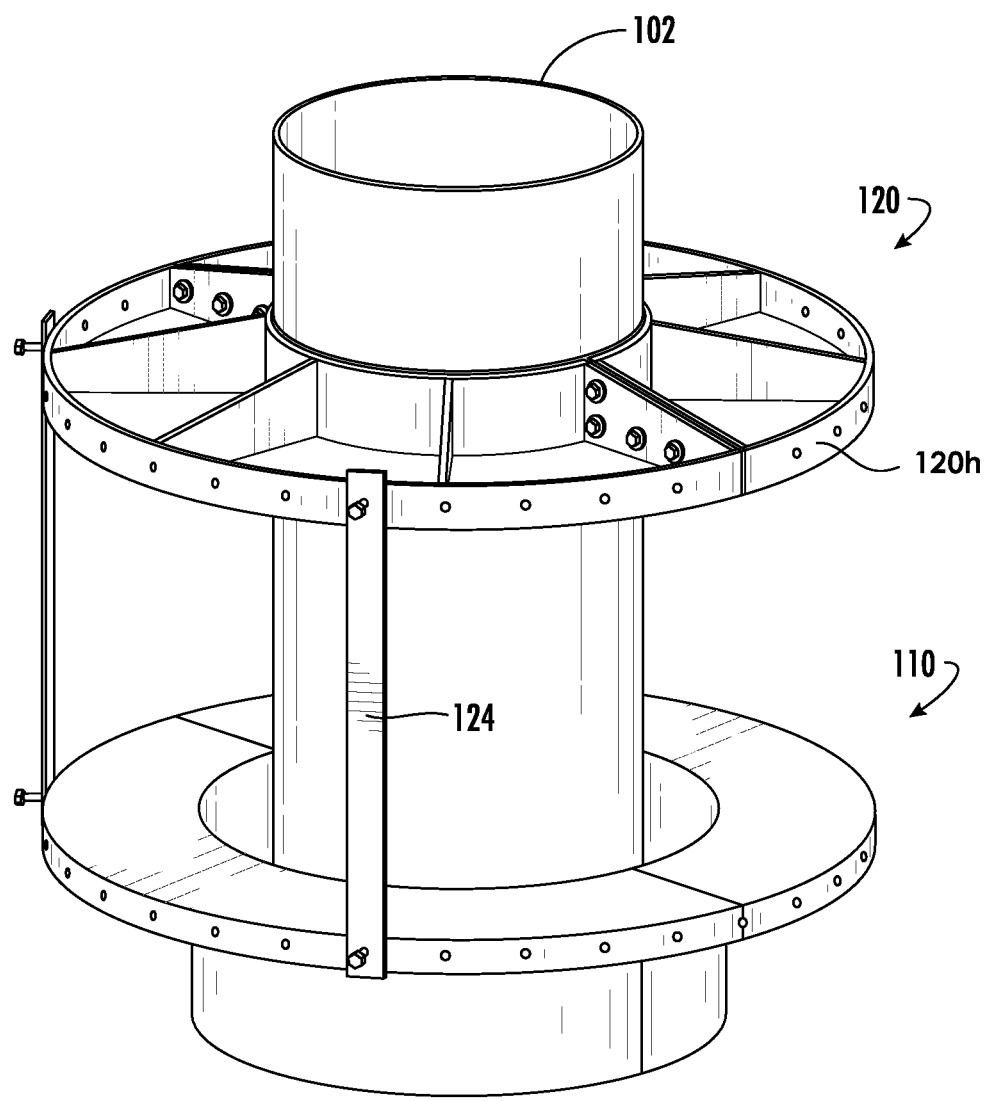
FIG. 7 is a perspective view of an example implementation of the penetration seal of the present disclosure shown in FIG. 6, including straps and an assembled upper collar.

The expansion sleeve 134 could have one or more layers of insulation, depending on the temperature of the environment in which it is used. Using fiberglass insulation as the insulating material, the maximum operation range of an expansion sleeve 134 would typically be in the 1,100 to 1,200 degrees Fahrenheit range. However, the expansion sleeve 134 can be designed to function in temperatures in the 2,000 to 2,400 degree Fahrenheit range using ceramic cloth as an insulation layer. The insulation layer serves to protect and limit heat transfer to the outer cover 134a of expansion sleeve 134, which can be a polytetrafluoroethylene (PTFE) coated glass material, such as Teflon®, that can typically withstand temperatures of around 650 degrees Fahrenheit. For an expansion sleeve 134 for use in a 1,000 degree Fahrenheit environment, a three-ply laminated construction of such expansion sleeve could include an aluminized fiberglass cloth on the inside ply, one inch of insulation mat material as the middle layer and then an outer layer, or cover, of PTFE material. For higher temperatures, additional insulation could be used and/or different materials could be used As shown in FIGS. 1-8, the present disclosure includes a method for installing penetration seal 100 for sealing penetration of pipe 102 extending through opening 106 in a vessel containing heated fluid, such as heated liquids and/or gases. The method includes attaching to wall 108 of the vessel 104 halves 110a and 110b of the first collar 110 such that halves 110a and 110b surround pipe 102 and are in fluid communication with the opening 106 in vessel 104 (FIGS. 4 and 5). The second collar 120 is attached to pipe 102 at a location spaced from the first collar 110, the sleeve portions 120f of second collar 120 being configured, upon collar segments 120a and 120b being brought together and fixed together with screws, rivets, bolts 120g, or some other suitable fasteners (FIGS. 6 and 7) to form a complete cylindrical sleeve 122, to compressively engage the exterior surface of pipe 102 sufficiently to frictionally fix the assembled second sleeve 120 against movement relative to pipe 102. Straps 124 are releasably attached to the first collar 110 and to the second collar 120 with screws 124a or bolts, as shown in FIGS. 6 and 7, wherein straps 124 selectively releasably fix the separation of the second collar 120 from the first collar 110 by a predetermined distance, which would be commensurate to accommodate the length of expansion sleeve 134.

As shown in FIGS. 2, 3, 8, and 9, pipe 102 is surrounded with at least one insulation pillow 130, and the insulation pillow 130 is attached to the first collar 110 and to the second collar 120 via a band 130a of the insulation pillow 130 engaging with a circumferentially extending rim, or lip, portion 110f. The lip portion 110f extends generally perpendicularly with respect to the flange portion 110c of lower collar halves, or segments, 110a and 110b, and a circumferentially extending rim portion 120h, to which a smaller end 120i of each trapezoidal-shaped rib 120d is attached.

Figure 2:
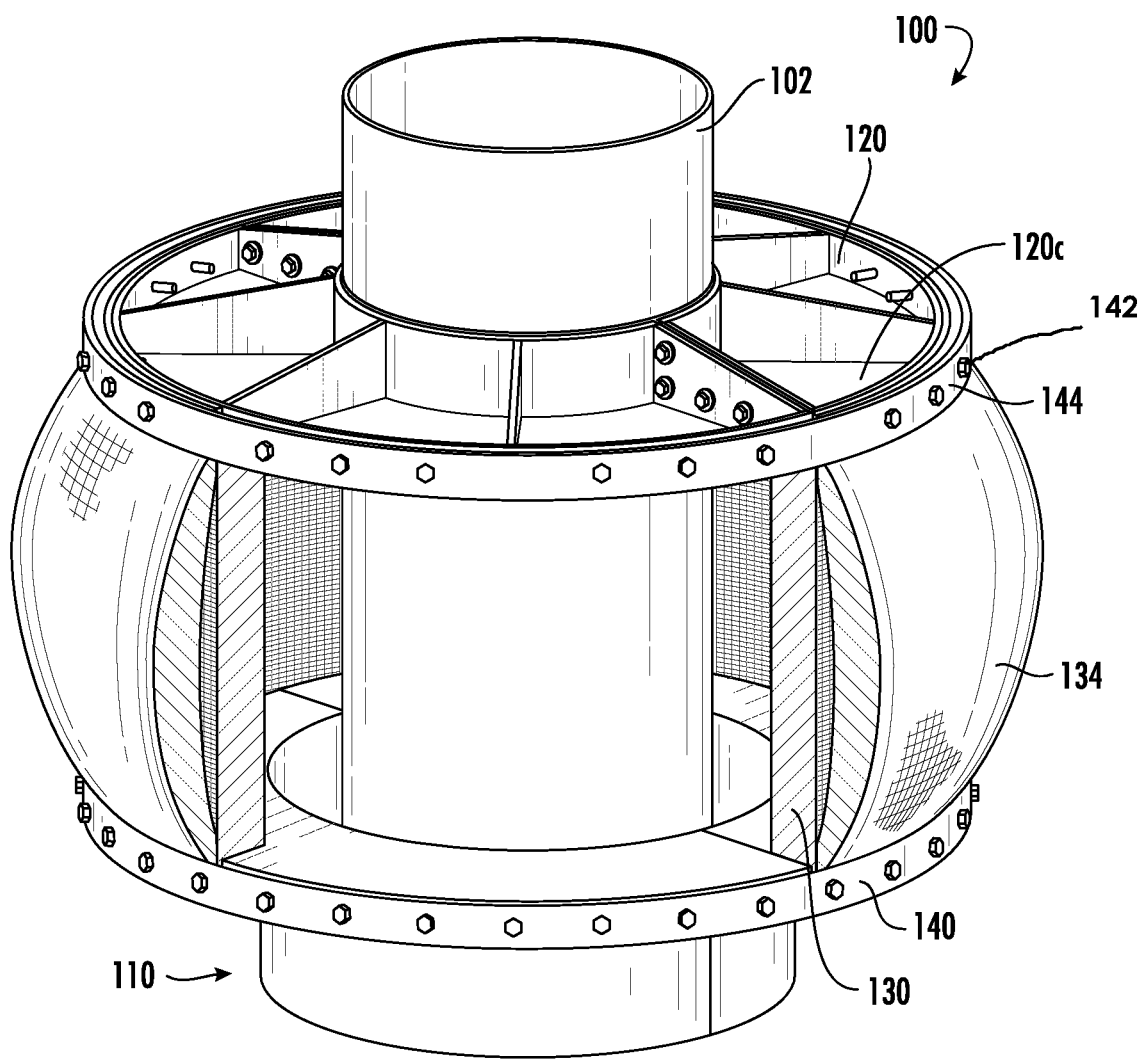
FIG. 2 is a perspective view, with parts cut away, of an example implementation of a penetration seal of the present disclosure shown in in FIG. 1.
Figure 3:
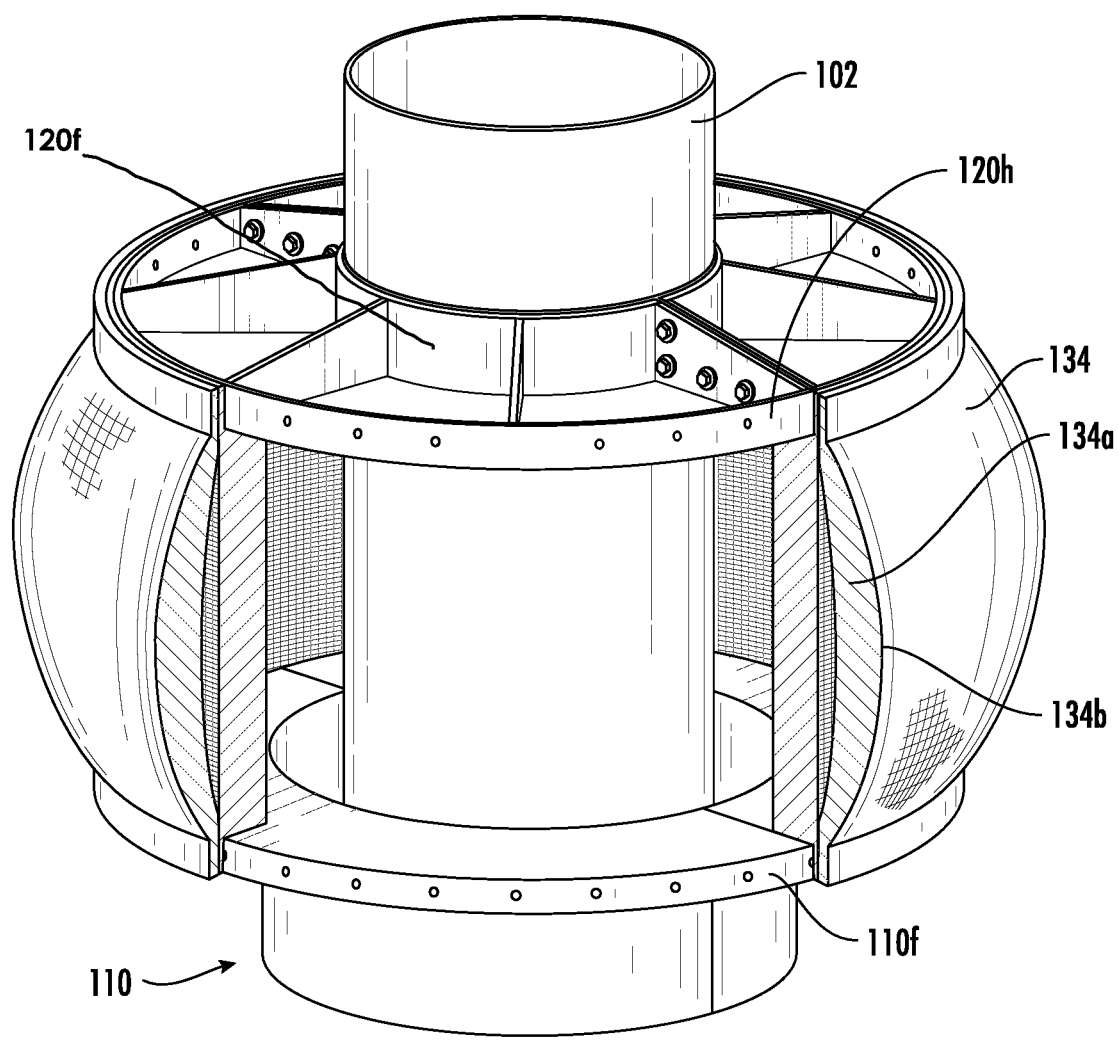
FIG. 3 is a perspective view, with parts cut away, of an example implementation of the penetration seal of the present disclosure shown in in FIGS. 1 and 2, prior to installation of attachment, backup, or ring, members.
Figure 8:
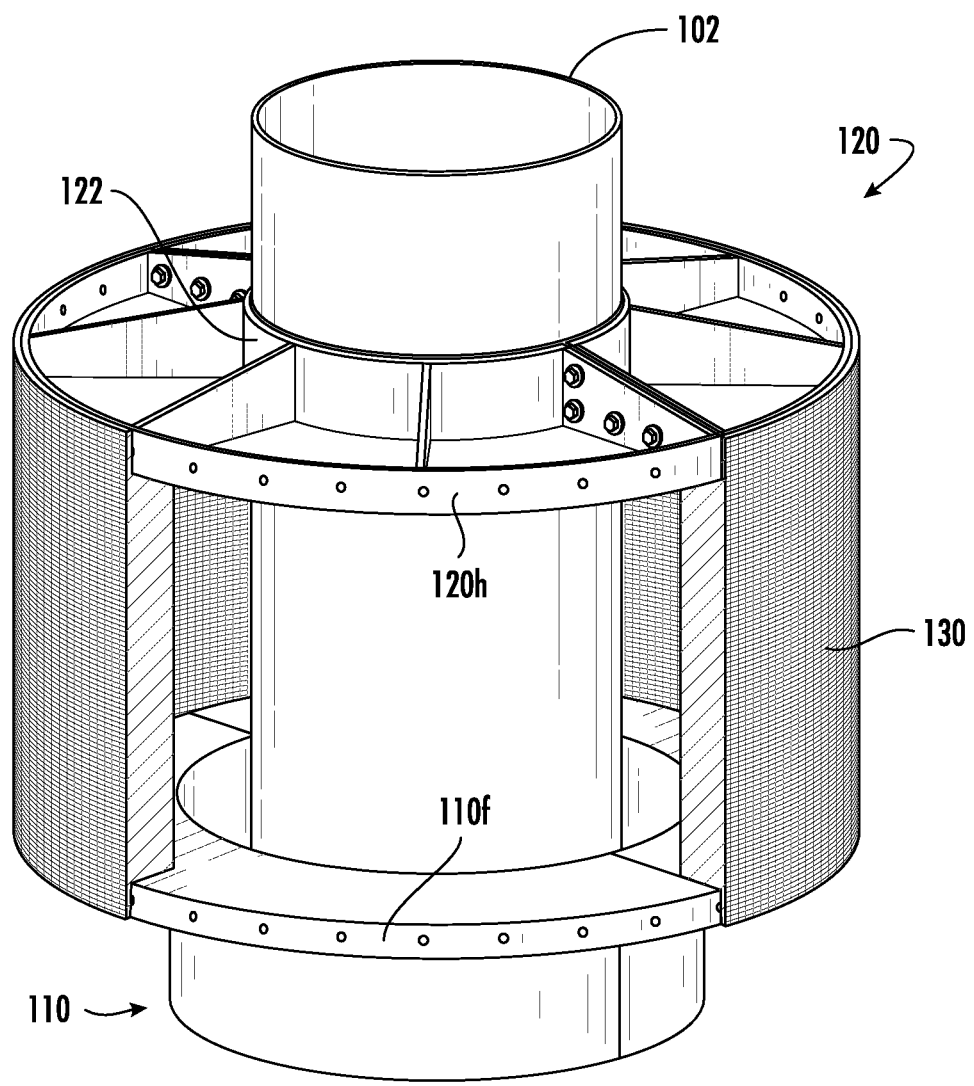
FIG. 8 is a perspective view of an example implementation of the penetration seal of the present disclosure shown in FIG. 7, including an insulation pillow.
Figure 9:
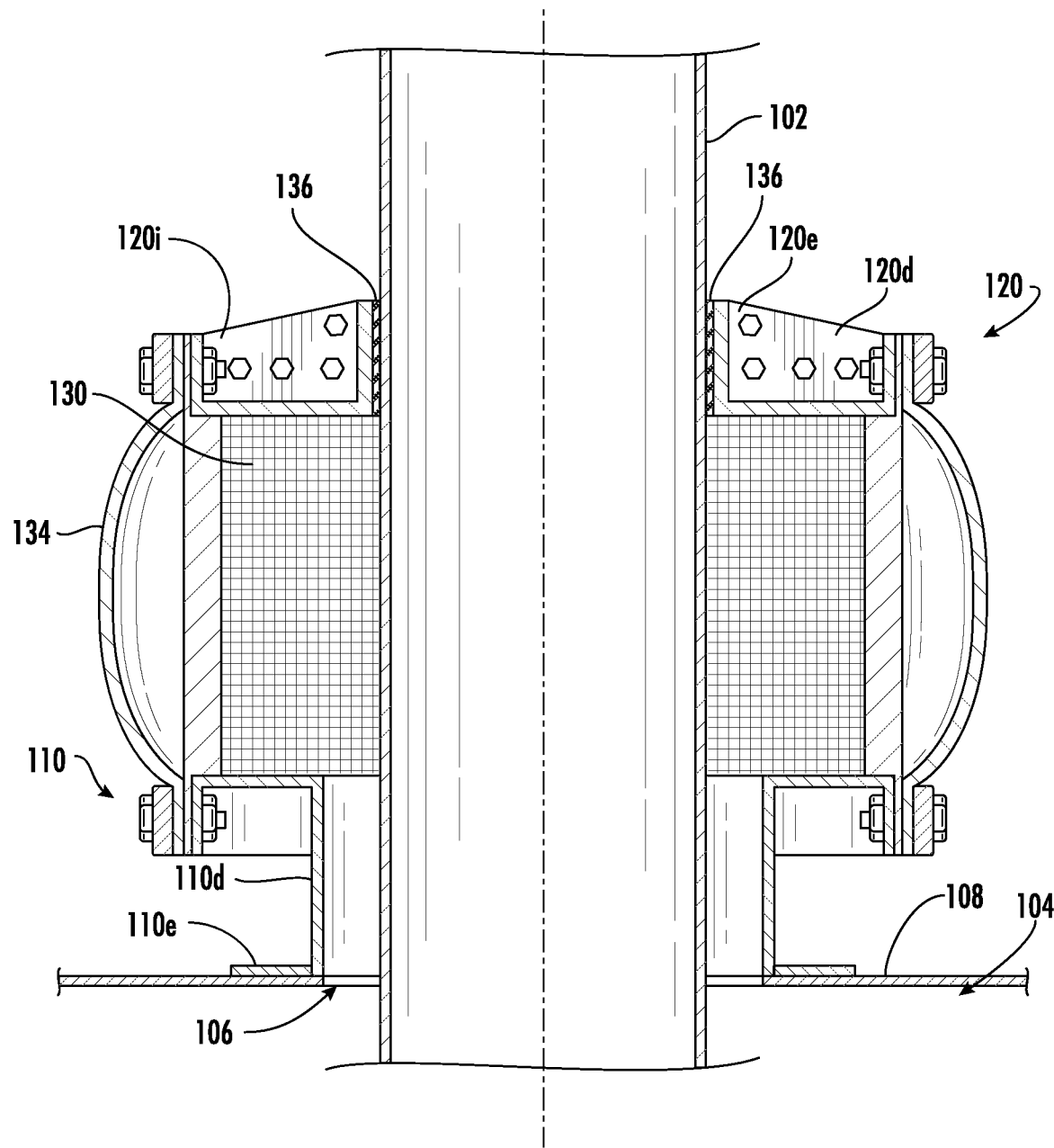
FIG. 9 is a sectional view of an example implementation of a penetration seal of the present disclosure.

The rim portion 120h extends generally perpendicularly with respect to the flange portion 120c of upper collar halves, or segments, 120a and 110b (FIGS. 8 and 9). The expansion sleeve 134 is attached to the lip 110f of first collar 110 and the rim 120h of the second collar 120 using at least one first ring 140, or arcuate segment of ring 140, which attaches the expansion sleeve 134 to the first collar 110 using screws, bolts, rivets or other fasteners, generally 142. A second ring 144, or arcuate segment of ring 144, attaches the expansion sleeve 134 to the second collar 120 attaches the expansion sleeve 134 to the first collar 110 using fasteners 142. (FIGS. 2 and 3).

Collars 110 and 120 could be constructed of steel and/or alloy material or any other suitable material.

Various implementations of the present disclosure may thus be connected to a pipe, duct, conduit, etc. without welding, thereby saving time on installation, cost and labor.

The above-disclosed features and functions, as well as alternatives, may be combined into many other different apparatuses or applications. Various presently unforeseen or unanticipated alternatives, modifications, variations or improvements may be made by those skilled in the art, each of which is also intended to be encompassed by the disclosed implementations.

The invention claimed is:

1. A penetration seal for a pipe extending through an opening in a vessel containing fluid, the penetration seal comprising: a first collar configured for surrounding the pipe adjacent the vessel and for being in fluid communication with the opening in the vessel; a second collar having a sleeve portion configured for engaging the exterior of the pipe and being spaced from the first collar; at least one insulation pillow configured to substantially surround the pipe and configured to be connected to the first collar and to the second collar; at least one expansion sleeve substantially surrounding the at least one insulation pillow and configured to be connected to the first collar and to the second collar; at least one first ring member configured to attach the expansion sleeve to the first collar; and at least one second ring member configured to attach the expansion sleeve to the second collar, wherein the sleeve portion of the second collar is configured to compressively engage the exterior surface of the pipe sufficiently to frictionally fix the second collar against movement relative to the pipe.

2. The apparatus of claim 1, wherein the second collar is generally ring-shaped and includes a plurality of semicircular second collar portions; and further comprising at least one ring member configured for attaching the expansion sleeve to the plurality of second collar portions.

3. The apparatus of claim 1, wherein the sleeve portion of the second collar is made of the same material as the pipe.

4. The penetration seal of claim 1, wherein the first collar is generally ring-shaped and includes a plurality of semicircular first collar portions.

5. The penetration seal of claim 1, further comprising: the first collar including a cylindrical portion having a radially-extending ring-shaped first flange with a circumferentially extending lip portion; the lip portion extending generally perpendicularly with respect to the first flange and being connected to the expansion sleeve: and a radially-extending second flange spaced from the first flange, wherein the second flange is configured for engagement with the vessel and for encircling the opening in the vessel.

6. The penetration seal of claim 1, wherein the sleeve portion is cylindrical and the second collar is generally ring-shaped; and further comprising the second collar including a circumferentially extending rim portion spaced from the sleeve portion, and the rim extending generally parallel to the sleeve portion.

7. The penetration seal of claim 1, wherein the sleeve portion is cylindrical and the second collar is generally ring-shaped; and further comprising: the second collar including a circumferentially extending rim portion spaced from the sleeve; the rim extending generally parallel to the sleeve portion; and a plurality of radially-extending ribs extending between the sleeve portion and the rim.

8. The penetration seal of claim 1, wherein the sleeve portion is cylindrical and the second collar is generally ring-shaped; and further comprising: the second collar including a circumferentially extending rim portion spaced from the sleeve portion; the rim extending generally parallel to the sleeve portion; and a plurality of radially-extending trapezoidal-shaped ribs extending between the sleeve portion and the rim.

9. The penetration seal of claim 1, further comprising at least one strap configured to be selectively attached to and removed from the first collar and the second collar, wherein upon the at least one strap being connected to the first collar and the second collar, the strap spaces the second collar from the first collar by a predetermined distance.

10. An apparatus, comprising: a vessel configured for containing a heated fluid, the vessel defining an opening in fluid communication with the heated fluid; a pipe extending through the opening; a penetration seal configured for attachment to the pipe and to the vessel, the penetration seal comprising: a first collar configured for surrounding the pipe adjacent the vessel and for being in fluid communication with the opening in the vessel; a second collar having a sleeve portion configured for engaging the exterior of the pipe and being spaced from the first collar; at least one insulation pillow configured to substantially surround the pipe and configured to be connected to the first collar and to the second collar; at least one expansion sleeve substantially surrounding the at least one insulation pillow and configured to be connected to the first collar and to the second collar; at least one first ring member configured to attach the expansion sleeve to the first collar; and at least one second ring member configured to attach the expansion sleeve to the second collar, wherein the sleeve portion of the second collar is configured to compressively engage the exterior surface of the pipe sufficiently to frictionally fix the second collar against movement relative to the pipe.

11. The apparatus of claim 10, wherein the second collar is generally ring-shaped and includes a plurality of semicircular second collar portions; and further comprising at least one ring member configured for attaching the expansion sleeve to the plurality of second collar portions.

12. The apparatus of claim 10, wherein the sleeve portion of the second collar is made of the same material as the pipe.

\* \* \* \* \*